United States Patent Office 3,317,393
Patented May 2, 1967

3,317,393
IMMUNIZATION BY SELECTIVE INFECTION OF THE INTESTINAL TRACT WITH AN ENCAPSULATED LIVE VIRUS
Robert M. Chanock, Bethesda, Robert J. Huebner, Ijamsville, and Robert B. Couch, Bethesda, Md., assignors to the United States of America as represented by the Secretary of the Department of Health, Education, and Welfare
No Drawing. Filed June 8, 1964, Ser. No. 373,587
12 Claims. (Cl. 167—78)

The invention described herein may be manufactured and used by or for the Government for governmental purposes without the payment of any royalty thereon in accordance with the provisions of the act of Apr. 30, 1928 (Ch. 460, 45 Stat., L. 467).

The invention relates to a new approach to the development of a vaccine which consists of live virus in an enteric-coated capsule. The encapsulated virus bypasses the susceptable respiratory tract and is liberated in the small intestine. The virus multiplies rapidly in the small intestine without causing clinical illness. This sub-clinical infection stimulates the production of neutralizing antibodies capable of protecting against later infection by the same type of virus.

The oral administration of live virus, instead of intramuscular injection of attenuated or inactivated virus, is a significant advance, particularly where there is need for rapid immunization of large groups, such as military recruits, among whom viral infections are rampant.

In the past, immunization has been produced by the administration of vaccines made either from killed viruses or attenuated viruses. The attenuation or weakening of a virus necessary to make the virus harmless enough to be employed as a live vaccine is a time-consuming and difficult process. A modicum degree of protection has been afforded by vaccine prepared from inactivated viruses, but such protection has been variable, particularly against respiratory infections.

This invention is particularly concerned with protection against respiratory infections. Adenoviral infection is now known to be an important cause of illness in civilian and military populations. Studies in civilian populations have shown that approximately 5 to 10 percent of patients with respiratory disease have evidence of adenoviral infection. Studies in the military have shown that the incidence of infection in recruits may be as high as 70 percent.

In the military, inactivated vaccine prepared in monkey kidney tissue culture has been shown to afford some degree of protection against adenoviral infection. The variability in the degree of protection conferred on subjects receiving inactivated vaccine, however, may in part, be attributed to the low level at which adenoviruses multiply in rhesus monkey kidney tissue cultures. In addition, there has been considerable difficulty in producing adenovirus seed material free of simian virus contamination. The most troublesome contaminating agent has been simian virus 40, which has been shown to produce tumors in new born hamsters and neoplastic transformation of transplanted human tissue. Because of these difficulties other approaches to immunization with adenovirus were employed. Adenoviruses are known to have a greater predilection for multiplication in the intestinal tract than in the respiratory tract. It was suggested that it might be possible to infect the intestinal tract and thereby bypass the region in which pathologic changes most often occur, i.e., the upper respiratory tract selectively. [Huebner, R. J., Respiratory Disease in the Americas, 1963, 87 (Supplement, p. 1).] This suggested technique of selective intestinal infection with adenoviruses for immunization against naturally occurring adenoviral disease was pursued. Type 3, 4 and 7 adenoviruses were selected as specific examples. In previous studies, it has been established that the site of multiplication and not the virulence of the virus was responsible for the benign course of intestinal adenoviral infection. It was possible to selectively infect the intestinal tract with adenoviruses 3, 4 and 7 by feeding virus contained in enteric-coated capsules, without any simultaneous respiratory infection. The antibody response that resulted from the selective intestinal infection was equal or superior to that following administration of types of inactivated vaccine. The antibody response following intestinal infection protects against naturally occurring adenoviral disease. When adenovirus types 4 and 7 were fed simultaneously, there was no evidence of virus interference.

The fecal excretion of adenovirus does not constitute an effective means for transmission of the agent to other persons in the environment. This technique of selective intestinal infection with adenoviruses forms a basis for immunization against naturally occurring adenoviral disease.

MATERIALS AND METHODS

*Preparation of virus pools.*—The strain of adenovirus 7 was recovered in human embryonic kidney (HEK) tissue culture from an anal swab of a 10-month-old female with a febrile upper respiratory tract illness. The strain of adenovirus 4 was recovered in HE2 culture from a throat swab of a 20-year-old marine with a febrile upper respiratory tract infection. The strain of adenovirus type 3 employed was designated Camp Lejeune 15520 and was isolated from a marine recruit with upper respiratory disease in fetal human diploid fibroblast tissue cultures. (Heubner, R. J., Rowe, W. P., and Chanock, R. M.: Newly recognized respiratory tract viruses, Ann. Rev. Microbiol., 1958, 12, 49.) Strains 7 and 4 were then given three additional passages in HEK cultures. The cells and tissue culture fluid from the fourth passage were frozen and thawed three times, centrifuged at 2,000 r.p.m., for 20 minutes, passed through an 800 m$\mu$ Millipore filter, distributed in 2-ml., amounts in vials and then stored at −20° C. until used. The adenovirus 7 pool titered $10^{9.2}$ TCD$_{50}$ (tissue culture dose 50) per ml., and the adenovirus 4 pool titered $10^{8.5}$ TCD$_{50}$ per ml., in HEK cultures. The adenovirus 3 pool titered $10^{8.2}$ per ml., in HEK cultures. This strain was given six additional passages in diploid fibroblasts.

The identity of the virus pools was confirmed in neutralization tests using specific hyperimmune rabbit serum.

*Safety tests.*—The safety test procedure employed was a modification of the one from this laboratory described previously. This modified procedure is outlined in Table I.

TABLE I.—SAFETY TEST PROCEDURE

| Test System | Test Designed for— | Volume and Method of Inoculation | Number of Test Units | Observation Period |
|---|---|---|---|---|
| Thioglycollate Broth | Bacteria, Fungi | 1 Ml. per Tube | 3 Tubes | 15 days. |
| Tissue culture: Hep II | Contaminating viruses: Adenoviruses, herpes B and RS viruses. | 0.2 ml. per tube | 4 tubes, virus x serum; 1 tube, virus alone; 1 tube, serum alone; 2 tubes, uninoculated. | 28 days with subpass at 14 days. |
| HEK | Adenoviruses, picornaviruses. | | | |
| W1-26 (Fibroblasts). | Picornaviruses | | | |
| Rabbit kidney | Herpes B viruses | | | |
| Green monkey kidney, 34° C.[1] | Myxoviruses | | | |
| Green monkey kidney, 37° C. | Simian virus 40 | | | |
| Animal inoculation: Adult mice | Contaminating viruses and bacteria: Neurotropic viruses (LCM, etc.). | 0.3 ml. IC [2] | 20 animals, virus alone; 20 animals, saline | 28 days. |
| Newborn mice | Coxsackie viruses | 0.01 ml. IC and SC [3] | 16 animals, virus alone; 8 animals, saline | Do. |
| Adult rabbits | Herpes B viruses | 0.1 ml. ID [4] ×10 and 2 drops on scarified cornea. | 2 animals | Do. |
| Guinea pigs | Mycobacterium tuberculosis. | 1 ml. IP [5] | 3 animals | 42 days.[6] |

[1] Hemadsorption test at 7, 14, and 28 days.
[2] Intracerebrally.
[3] Subcutaneously.
[4] Intradermally.
[5] Intraperitoneally.
[6] Autopsied for tuberculosis at termination

*Virus recovery.*—Throat and anal swabs were immersed in 2 ml., of veal infusion broth containing 0.5 percent bovine albumin, which was then stored at −20° C. until tested. Specimens were tested for the presence of virus by inoculation of 0.4 ml., of throat or anal swab fluid into one culture of HEK. The cultures were observed for cytopathic effect for 14 days, after which negative cultures were frozen, thawed, and passaged into fresh KEH cultures, which were observed for an additional 14 days.

An additional procedure was introduced for those persons who received both type 4 and 7 viruses simultaneously. In this instance, one aliquot of anal swab fluid was incubated with an equal volume of a 1:20 dilution of type 4 hyperimmune rabbit serum and another aliquot was incubated with an equal volume of 1:20 dilution of type 7 hyperimmune rabbit serum. These sera at a dilution of 1:20 were capable of neutralizing more than $10^{5.5}$ $TCD_{50}$ per ml., of homotypic virus, although inhibition of heterotypic virus did not occur. Incubation of serum-specimen mixtures was carried out for one hour at room temperature prior to inoculation into HEK cultures. Fresh antiserum was added to the HEK cultures during each fluid change.

*Identification of isolates.*—The first and last isolates from each person were identified by hemagglutination-inhibition (HI) with specific hyperimmune rabbit serum (Rosen, L., A hemagglutination-inhibition technique for typing adenoviruses, Amer. J. Hyg., 1960, 71, 120). All isolations from persons who received both types 4 and 7 virus were first identified by hemagglutination pattern; type 4 isolates agglutinated rat but not rhesus erythrocytes, and type 7 isolates showed the reverse pattern. In every instance viruses isolated from specimens incubated with type 7 antiserum gave a type 4 hemagglutination pattern, and specimens incubated with type 4 antiserum gave a type 7 hemagglutination pattern. In addition, the first and last isolate of each type for each three-week period were also identified by HI with specific hyperimmune rabbit serum.

*Neutralization tests.*—All neutralization tests were performed in HEK tissue culture using a test dose of virus calculated to give 32–100 $TCD_{50}$ after four to six days of incubation. Selection of susceptible persons was made by screening all sera at a final serum dilution of 1:4. Following each experiment pre- and post-inoculation sera were titrated simultaneously for neutralizing antibody. A 1:2 dilution of serum was inactivated at 56° C. for 30 minutes, then serial fourfold dilutions of this serum were made with Hanks' basal salt solution (BSS). An equal volume of virus was added to each serum dilution and the mixture was incubated at room temperature for 60 minutes. Two-tenths of a milliliter of this mixture was then inoculated into each of two tissue culture tubes. The quantity of virus used in the test was determined in a simultaneous titration in which tenfold dilutions of virus were inoculated into each of two HEK cultures. Results were recorded when the virus titration indicated that 3.2 $TCD_{50}$ was present. The test was then read daily until the quantity of virus in the titration exceeded 100 $TCD_{50}$. All titers, except as otherwise noted, are expressed as a final dilution of serum completely inhibiting cytopathic effects of 32–100 $TCD_{50}$ of adenovirus.

In addition to serum specimens from persons receiving enteric-coated capsules of live virus, paired serum specimens from those who received inactivated vaccine were tested by the HEK neutralization technique.

*Clinical procedures.*—All persons subject to selective intestinal infection were free of detectable antibody to the inoculated virus at a final serum dilution of 1:4. A test of the effectiveness of the immunization produced by the enteric-coated capsules containing virus was made by isolating a group of men, 3 to a room, for 10 to 14 days following inoculation. Except for the physicians who evaluated these men daily and the technicians who collected specimens, no other persons were allowed into the rooms. The examining physicians performed their evaluation without knowledge of the virus administered or the mode of administration.

*Preparation of the inoculum.*—(1) In the original test series the inoclum was prepared by placing 0.05 ml., of a 1:10 dilution of the virus pool within a #1 hard gelatin capsule followed by a rotation of the capsule to spread the fluid over the inner surface. The #1 capsule was then placed within a #10 hard gelatin capsule. The latter capsule was immersed three times, with allowance for drying between immersions, in a solution of 10 percent w./v. cellulose acetate hydrogen phthalate in acetone. The participants swallowed the capsules under supervision within 30 minutes after preparation. (2) In later large scale experiments, the preparation of the inoculum was expedited by preliminary preparation of the individual #2 hard gelatin capsule wherein the interior of the cap and the exterior of the insert were given a coating with cellulose acetate hydrogen phthalate. When an order for vaccine was received, an inoculum of 0.05 ml., of a 1:10 dilution of the virus pool was placed within each coated capsule, followed by rotation of the capsule to spread the fluid over the inner surface. The #2 capsule was placed within a #0 hard gelatin capsule. The latter was immersed twice, with allowance for drying between immersions, in a solution of 10 percent w./v. cellulose acetate hydrogen phthalate. The capsules were then supplied to the clinician for administration within about half an hour. (3) The preparation of the enteric-coated capsule was slightly modified in order to make handling of larger numbers of capsules more practicable. 0.3 ml. of liquid virus pool was placed within a #1 hard gelatin capsule whose interior had been pre-coated with a solution of 10% cellulose acetate hydrogen phthalate in acetone. This inner capsule was then placed in a #0 hard gelatin capsule which was immersed twice in the cellulose solution. This minor modification was found to have no effect on disintegration of the capsule or survival of the virus inoculum.

*Lyophilization of the virus.*—In order to maintain a reserve supply of virus, it was necessary to develop a technique of preservation which would retain the stability of the virus. By lyophilization of the virus fluid in the presence of selected additives a stable product could be produced. The addition of approximately 5 percent skim milk, 2½ percent gelatin, and 0.5 percent human serum albumin to the filtered virus fluid would serve to protect the virus. In a typical lot of virus fluid prepared for lyophilization there were included:

| | Milliliters |
|---|---|
| Virus fluid (filtered) | 1760 |
| 20% skim milk (autoclaved at 10 lbs., for 10 minutes) | 440 |
| 5% U.S.P. gelatin (autoclaved at 15 lbs., for 15 minutes) | 35 |
| 5% human serum albumin | 21 |

This mixture was lyophilized by the tray-dried technique to produce a total of 105 grams of lyophilized product. One ml. of original virus fluid was present in 60 mg., of lyophilized material.

*Test of enteric-coated capsule.*—(1) Titre: A capsule was incubated at 34° C. for three hours, then ruptured, washed out with BSS, and titered in HEK tissue culture. These titrations indicated that the dose of virus administered varied between $10^{5.8-7.2}$ $TCD_{50}$ for adenovirus 7, $10^{5.8-6.2}$ $TCD_{50}$ for adenovirus 4, and $10^{7.8}$ $TCD_{50}$ for adenovirus 3. (2) Disintegration time: The time at which capsules disintegrated within the intestine was determined by performing serial roentgenograms on the volunteers after simultaneously administering a similarly prepared capsule containing barium sulfate. The time of capsule disintegration varied between one and five hours and bore no relationship to the results obtained.

Disintegration occurred in the intestinal tract but *not* in the stomach. The enteric-coated capsules containing virus seeded the virus directly into the intestinal tract. Infection was restricted to the intestinal tract since virus was shed from the intestine, but could not be recovered from the throat.

RESULTS

Adenovirus 7

*Virus recovery.*—Antibody—free persons were selected for a test of effectiveness of the inoculation. All shed type 7 adenovirus from the intestinal tract following administration of this agent by enteric-coated capsule. Most of the persons executed virus during the period from day 2 to day 15. The total duration of excretion varied from 5 to 24 days or more. Virus was first recovered from the first to eleventh day following administration. The last isolates were obtained between the eighth to the twenty-fifth day. The "median man" began excreting virus on day 2 and ceased on day 16 (a duration of 14 days). Virus was not recovered from the throat specimens of any of these persons. These findings indicate that susceptible persons can be infected via the intestinal tract with type 7 adenovirus and that this infection can remain localized to the lower enteric tract.

*Serum antibody.*—The results of testing paired serum specimens showed that pre-inoculation sera lacked detectable antibody at a final serum dilution of 1:4. The level of antibody three weeks after inoculation bore no relationship to the virus excretion pattern. Almost all participants had a fourfold or greater rise in neutralizing antibody. All participants were infected since virus was recovered from their anal swab specimens on numerous occasions.

*Illness.*—None of the participants developed an illness which could be specifically associated with adenovirus 7 infection. These persons remained afebrile throughout the 21- to 25-day observation period. In addition, they failed to develop signs or symptoms of respiratory illness.

*Communicability of enterically infected type 7 volunteers.*—The communicability of participants who shed virus only from the intestinal tract was examined in the following manner:

Participants lacking detectable antibody to adenovirus 7 were housed three to a room. Two men in each room were fed capsules containing adenovirus 7 and one man in each room was fed a capsule containing saline. Neither volunteers nor examiner had any knowledge of what was administered.

Type 7 adenovirus was shed from the intestinal tract, but not from the throat of all men who received capsules containing virus. None of the three contact volunteers shed virus from either the throat or intestinal tract during the 25-day observation period. In addition, the placebo-inoculated volunteers failed to develop antibody after 24 days of exposure to volunteers excreting adenovirus 7. None of the volunteers developed illness during the observation period. The conditions of the experiment represented fairly intimate exposure. This suggests that intestinal shedding of adenovirus 7 does not constitute an effective means for transmission of the agent to other adults.

*Comparison of antibody response to that following other types of exposure to adenovirus 7.*—Antibody titers attained following natural infection, enteric infection, and inoculation with two types of inactivated vaccine were compared. The persons tested were selected because they lacked detectable antibody in the pre- or acute phase serum. The antibody titers detected in convalescent sera following natural infections with type 7 adenovirus varied between 1:128 and 1:1024. The antibody titers which developed following enteric infection varied between 1:4 and 1:256. The antibody response following administration of aqueous vaccine was similar to that following intestinal infection. These results indicate that the antibody response following selective intestinal infection is equal or superior to that following administration of aqueous or adjuvant-inactivated vaccine.

Adenovirus 4

All antibody-free volunteers shed adenovirus 4 from the intestine following feeding of this virus in enteric-coated capsules. Virus was not isolated from throat swab specimens throughout the observation period. The pattern of intestinal shedding of type 4 adenovirus differed from that of type 7 in that it began later and stopped earlier. Measurable antibodies appeared by the tenth day past vaccination. All volunteers developed a fourfold or greater rise in antibody. No illness occurred during the 25-day observation period.

The antibody response of volunteers enterically-infected with adenovirus 4 was superior to that following administration of inactivated vaccine.

Adenovirus 3

Volunteers free of homologous neutralizing antibody were fed liquid preparation adenovirus type 3 contained in an enteric-coated capsule. The enteric capsules were prepared by the modified method described previously. Each volunteer received about $10^{7.8}$ $TCD_{50}$ as determined by simultaneous titration of a capsule in primary HEK cultures. None of the volunteers experienced a clinical reaction during 3 weeks of observation. Each of the volunteers excreted adenovirus type 3 from the lower G-I tract and developed significant titers of circulating neutralizing antibody.

*Simultaneous infection with adenoviruses 4 and 7*

Type 4 and 7 adenoviruses are often prevalent simultaneously in certain military recruit populations. For this reason it is of importance to immunize against both types as soon as possible after the start of recruit training. If enteric immunization with adenoviruses in the military is to be successful, intestinal infection with both types must be produced simultaneously or within a short period of each other.

The possibility of inducing a dual intestinal infections was investigated by administering a capsule containng type 4 adenovirus and a capsule containing type 7 adenovirus at the same time to each volunteer. These volunteers were free of antibody to both viruses. The viruses were administered in separate capsules rather than in the same capsule. This was done as it was possible that the capsules might disintegrate at different levels of the intestinal tract and thus increase the likelihood of infecting a large number of susceptible cells, and in this manner decrease the possibility of virus interference. The inoculation procedure was repeated three weeks later.

*Virus recovery.*—The virus excretion patterns of volunteers fed types 4 and 7 adenoviruses show that all men shed adenovirus 7 from the intestine throughout the six-week observation period. In all instances, type 7 virus shedding began earlier and lasted longer than when only adenovirus 7 was fed.

The pattern of type 4 shedding of these volunteers was similar to that seen in volunteers who received only adenovirus 4.

The quantity of virus present in specimen fed types 4 and 7 adenovirus simultaneously was compared with the quantity present in anal swab fluid obtained from volunteers fed either virus alone. There was no significant difference in the amount of virus recovered from volunteers who were singularly or dually infected.

*Serum antibody.*—Antibody response to adenoviruses 4 and 7 fed simultaneously compared favorably with the antibody response to these viruses when fed at separate times. In the case of adenovirus 7, there is a rise in antibody in all tests with 3.2 $TCD_{50}$ and in a majority of tests with the standard 32–100 $TCD_{50}$. All persons developed antibody to adenovirus 4.

We claim as our invention:

1. As an immunization agent for selective infection of the intestinal tract, an enteric-coated gelatin capsule containing unattenuated live virus.
2. As an immunization agent for selective infection of the intestinal tract, an enteric-coated gelatin capsule containing live adenovirus.
3. As an immunization agent for selective infection of the intestinal tract, an enteric-coated gelatin capsule containing live adenovirus type 7.
4. As an immunization agent for selective infection of the intestinal tract, an enteric-coated gelatin capsule containing live adenovirus type 4.
5. As an immunization agent for selective infection of the intestinal tract, an enteric-coated gelatin capsule containing live adenovirus type 3.
6. As an immunization agent for selective infection of the intestinal tract, an enteric-coated gelatin capsule containing unattenuated live virus, wherein the coating is cellulose acid hydrogen phthalate.
7. A method of immunization against viral respiratory disease which comprises bypassing the respiratory tract and selectively infecting the intestinal tract by means of oral administration of an enteric-coated capsule containing unattenuated live virus, whereby the unattenuated live virus is seeded directly into the intestinal tract.
8. The method of claim 7, wherein the live virus is an adenovirus.
9. The method of claim 7, wherein the virus is adenovirus type 7.
10. The method of claim 7, wherein the virus is adenovirus type 4.
11. The method of claim 7, wherein the virus is adenovirus type 3.
12. A method of immunization against viral respiratory disease which comprises bypassing the respiratory tract and selectively infecting the intestinal tract by means of simultaneous oral administration of an enteric-coated capsule of adenovirus type 7 and an enteric-coated capsule of adenovirus type 4, whereby both types of live viruses are seeded directly into the intestinal tract.

References Cited by the Examiner

UNITED STATES PATENTS

| | | | |
|---|---|---|---|
| 2,369,218 | 2/1945 | Dick et al. | 167—78.2 |
| 2,946,724 | 7/1960 | Valentine | 167—78 |

OTHER REFERENCES

Allisbaugh et al., Proceedings of the Indiana Academy of Science, vol. 4, pp. 59–64, 1938.

LEWIS GOTTS, *Primary Examiner.*

ELBERT L. ROBERTS, *Examiner.*

R. HUFF, *Assistant Examiner.*